United States Patent Office 3,245,296
Patented Apr. 12, 1966

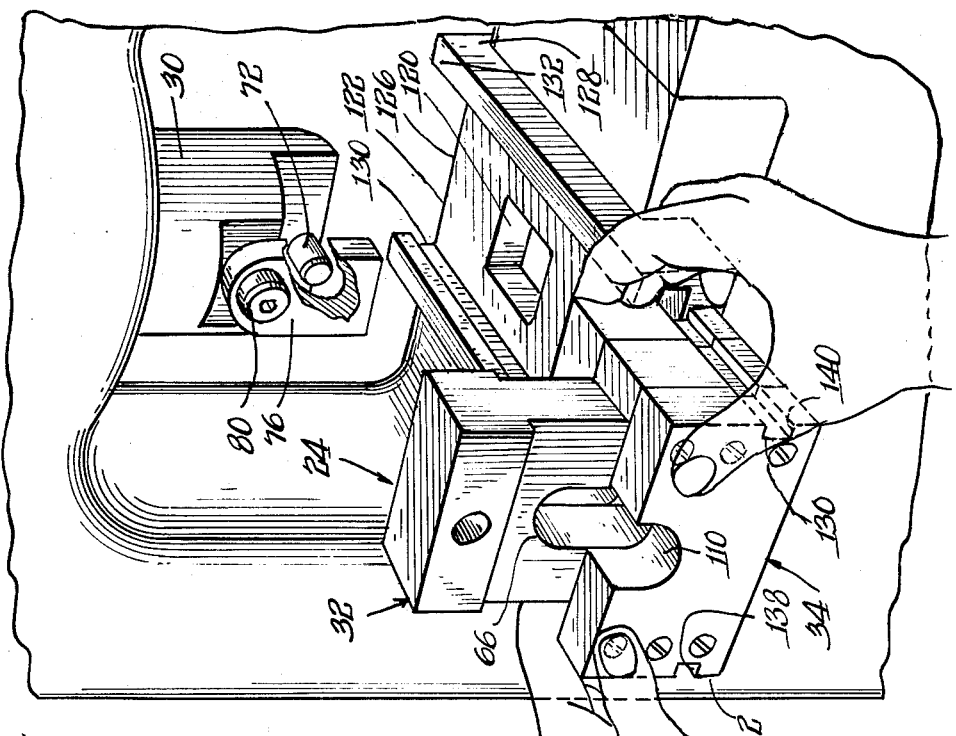

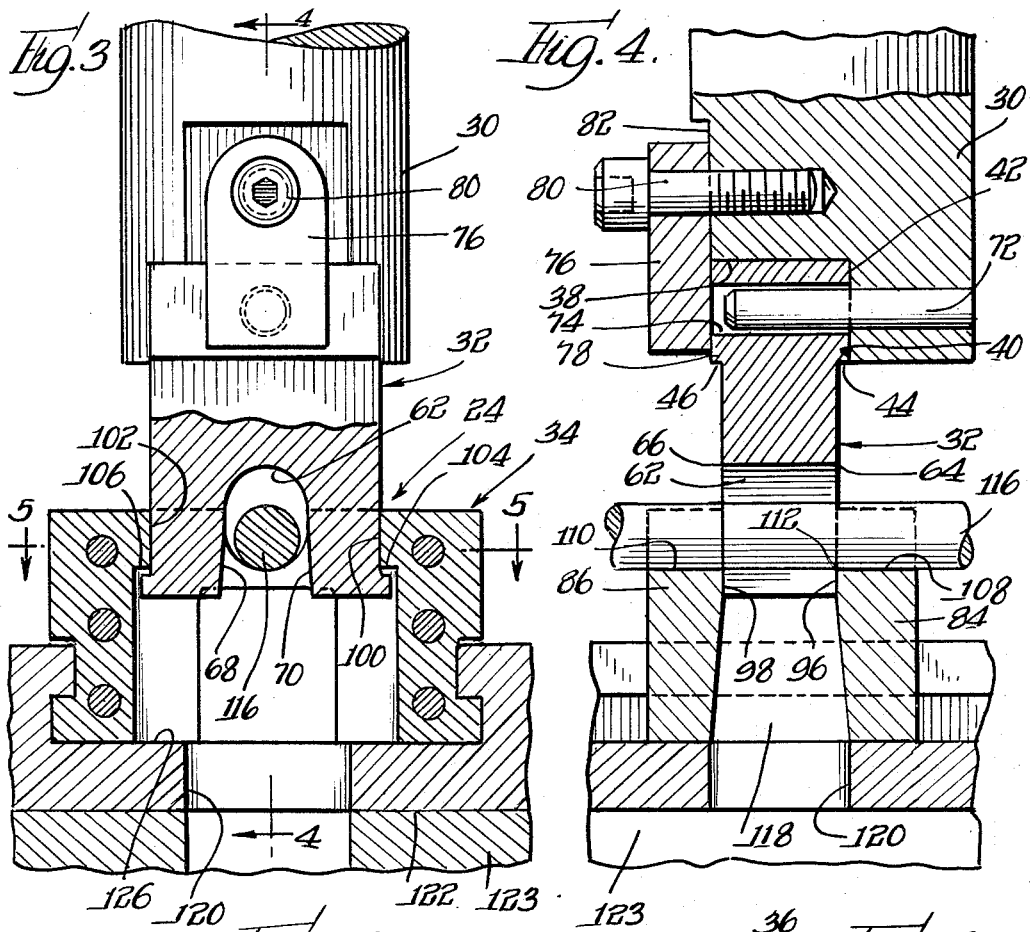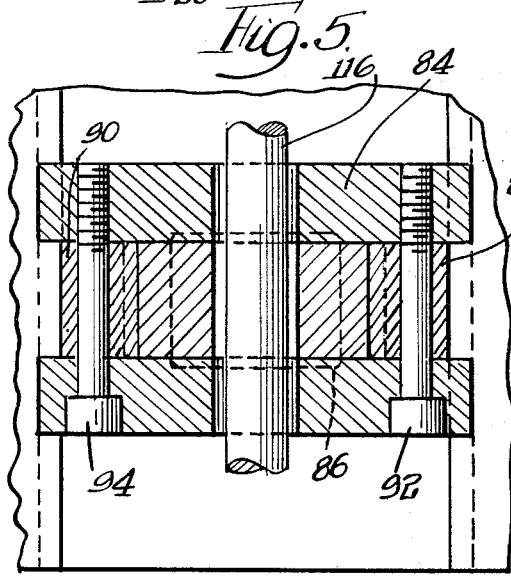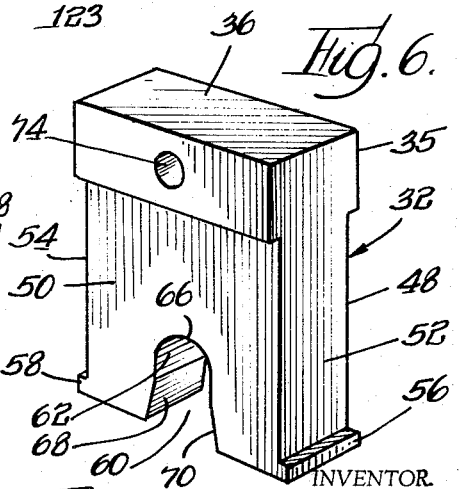

3,245,296
APPARATUS FOR SEVERING SLUGS
FROM BAR STOCK
Raymond L. Valente, Kankakee, Ill., assignor to Manco Manufacturing Co., Bradley, Ill., a corporation of Illinois
Filed Feb. 10, 1964, Ser. No. 343,810
8 Claims. (Cl. 83—162)

The present invention relates to a novel apparatus for severing workpieces, and more specifically to an apparatus especially suitable for cutting short lengths or slugs from pieces of bar stock.

As will be understood, it is frequently desired to obtain short lengths or slugs from workpieces such as metal bar stock in order to subject such slugs to various tests for the purpose of determining the characteristics of the metal. Thus it has been proposed to provide shearing apparatus with cooperable dies for severing such slugs from the bar stock. Since the bar stock to be tested may come in any of a wide variety of diameters, it has been necessary to provide such apparatus with a plurality of different sets of cooperable dies in order to accommodate the different sizes of bar stock. As a result, considerable amounts of time and labor have heretofore been required in any testing operation merely for the purpose of assembling and adjusting the dies of the correct size in the apparatus.

An important object of the present invention is to provide a novel apparatus for severing slugs and the like from a length of bar stock and having a plurality of different sets of cooperable dies which may be easily and quickly assembled as units with the remainder of the apparatus.

A more specific object of the present invention is to provide a novel apparatus of the above-described type having sets of cooperable die or blade and anvil means preassembled with each other and adapted to be installed in the remainder of the apparatus easily and without requiring any further adjustment or alignment.

Other objects and advantages of the present invention will become apparent from the following description and the accompanying drawings, wherein;

FIG. 1 is a perspective view showing an apparatus incorporating features of the present invention;

FIG. 2 is an enlarged fragmentary perspective view showing how a blade and anvil set incorporating features of the present invention may be assembled with or removed from the remainder of the apparatus as a unit;

FIG. 3 is an enlarged fragmentary partial sectional view showing a shearing blade and anvil set incorporating features of the present invention assembled with the remainder of the apparatus;

FIG. 4 is a fragmentary sectional view taken generally along line 4—4 in FIG. 3;

FIG. 5 is a fragmentary sectional view taken along line 5—5 in FIG. 3; and

FIG. 6 is a perspective view showing a die or blade member incorporated in the apparatus of the present invention.

Referring now more specifically to the drawings wherein like parts are designated by the same numerals throughout the various figures, an apparatus 10 incorporating features of the present invention is shown in FIG. 1 and comprises a frame 12 which may be mounted on any suitable support such as a stand 14. The frame 12 comprises a base portion 16 and a head portion 18 connected to the base portion by upstanding side sections 20 and 22. If desired the frame 12 may be cast or otherwise formed in one piece.

A plurality of die set units 24 constructed in accordance with features of the present invention described in detail below is included in the apparatus, which die set units are selectively interchangeable for processing workpieces or bar stock of different diameters. As indicated in FIG. 1, when one die set unit 24 is assembled with the frame 12, remaining die set units 24a, 24b and 24c may be stored on a shelf 26 provided in the stand 14. Of course, any desired number of interchangeable die set units may be provided.

In order to actuate a die set unit assembled with the frame 12, the apparatus is provided with a hydraulic cylinder 28 mounted on the head portion 18 for reciprocably actuating a ram 30. Suitable hydraulic fluid supplying and control means of known construction, not shown, are connected with the cylinder 28 for selectively advancing the ram 30 toward the base 16 through a working stroke and for retracting the ram.

Each of the die set units 24 comprises a first die or blade member 32 and cooperable anvil means 34. The blade member and anvil means are assembled and interconnected with each other so that they may be readily handled as a unit and assembled with the frame and ram of the apparatus quickly and easily and without requiring time consuming adjustments.

The blade member 32 comprises an enlarged upper end 35 presenting an upwardly facing end surface 36 adapted to abut a complementary surface 38 formed on the lower end of the ram. The ram surface 38 provides one side of a recess in the ram which is defined by a vertical surface 40 engageable with a side 42 of the enlarged head portion 35. The enlarged head portion presents downwardly facing shoulders 44 and 46 for a purpose described below.

The blade member 32 comprises an elongated blade portion extending downwardly from the enlarged head portion and having opposite flat substantially parallel sides 48 and 50 extending downwardly from inner margins of the shoulders 44 and 46. Opposite ends or edges of the blade portion are defined by substantially flat parallel surfaces 52 and 54 extending between the side surfaces 48 and 50. Flanges 56 and 58 project laterally outwardly from lower ends of the surfaces 52 and 54 for interengagement with the anvil means as will be discussed further below.

A vertically elongated slot 60 is formed in the lower edge of the blade member and has an upper end defined by a rounded surface 62 providing rounded shearing edges 64 and 66 at the intersections with the opposite side surfaces 48 and 50. The diameter of the generally semi-circular surface 62 is varied in accordance with the diameter or transverse dimensions of the bar stock to be severed and thus the various die set units 24 of the apparatus are identical to each other with the exception of the diameter of their respective rounded shearing surfaces and the width of the associated slots whereby the different die set units are adapted to accommodate workpieces of different diameters. Opposite sides of the slot 60 are further defined by side surfaces 68 and 70 which diverge with respect to each other from junctions with the surface 62 for providing the slot 60 with an enlarged mouth.

The blade member 32 is adapted to be easily releasably connected to the ram 30 by means including a pin 72 fixed to the lower end of the ram and extending transversely from the surface 44 of the ram. The head portion 35 of the blade member is provided with a transversely extending aperture 74 adapted to receive the pin 72. Preferably the diameter of the aperture 74 is slightly oversize as compared with the diameter of pin 72 so that during downward movement of the ram through a working stroke, the upper surface 36 of the blade member will bear firmly against the downwardly facing surface 38 of the ram and no strain will be placed on the pin 72. However, the pin 72 is effective for retaining the blade member for upward movement with the ram.

A latch member 76 is positioned for overlying a side surface 78 of the blade member head portion opposite from the surface 42 for retaining the blade member on the pin 72. The latch member 76 is pivotally supported on a screw 80 or other suitable means fixed to the ram 30 and projected from a flat side surface 82 formed on the ram so as to be disposed in the same plane as the surface 78 of the blade member. Thus in order to disconnect the blade member from the ram, it is merely necessary to turn the latch member 76 out of engagement with the surface 78 and then pull the blade member from the pin 72.

Each anvil means 34 comprises a first pair of side members 84 and 86 and a pair of intermediate side members 88 and 90. A plurality of screws 92 extend through the side members 84, 86 and 88 and similar screws 94 extend through the side members 84, 86 and 90 for securing the side members in assembled relationship. As shown best in FIG. 4, the side members 84 and 86 present substantially flat parallel guide surfaces 96 and 98 cooperable with the flat opposite side surfaces 48 and 50 of the blade member. Furthermore, as shown in FIG. 3, the side members 88 and 90 present inwardly facing flat parallel guide surfaces 100 and 102 cooperable with the opposite flat edge surfaces 52 and 54 of the blade member. Thus the blade member is effectively aligned with and guided with respect to the anvil means during operation of the apparatus. In this connection it is to be noted that the opposite side members 88 and 90 present shoulder surfaces 104 and 106 cooperable with the shoulders 56 and 58 on the blade member for preventing axial separation of the blade member upwardly from the anvil means. Furthermore, the downwardly facing shoulders 44 and 46 on the enlarged head portion of the blade member prevent axial separation of the blade means downwardly from the anvil means. Thus the blade member and anvil means are permanently inter-connected and during normal usage no further adjustment or alignment is necessary.

The opposite side members 84 and 86 of the anvil means also include upwardly facing notches defined by semi-circular surfaces 108 and 110 which present semi-circular shearing edges 112 and 114 at junctions with the inner guide surfaces 96 and 98. The shearing edges 112 and 114 are substantially complementary to the cutting edges of the blade member for severing a slug from a piece of bar stock 116 when the bar stock is positioned as shown in FIGS. 3-5 and the ram is moved downwardly through a working stroke. A severed slug is adapted to fall from the slot 60 through a space 118 defined by the sides of the anvil means and an opening 120 in an anvil means mounting member 122 and as lot 123 provided in the base 16 of the frame and finally into a collecting tray 124 shown in FIG. 1.

In order to connect the anvil means with the base portion 16 of the apparatus, the generally channel-shaped member 122 is fixed by means of screws or other suitable devices to the base member and presents a flat upwardly facing surface 126 providing a firm support for the anvil means. The channel member includes upstanding side flanges 128 and 130 which terminate in inturned flanges 132 and 134. As shown best in FIGS. 1-3, the anvil means is provided with slots 136 and 138 traversing opposite sides thereof and adapted to accommodate the inturned flanges 132 and 134. The slots are partially defined by upwardly facing shoulders 140 and 142 which are adapted to cooperate with the inturned flanges 132 and 134 in preventing the anvil means from lifting substantially from the support surface 126. It will be observed that the anvil means may be readily assembled with the channel member or removed therefrom by a simple sliding movement. No additional fastening means is required since the latch member 76 which retains the blade member effectively releasably retains the anvil means through cooperation with the blade member at the desired location on the channel member 122.

While a preferred embodiment of the present invention has been shown and descirbed herein, it is obvious that many structural details may be changed without departing from the spirit and scope of the appended claims.

The invention is claimed as follows:

1. In an apparatus of the type described having a frame including a base portion and a ram reciprocably mounted on said frame for movement toward and away from said base portion, said ram having a surface facing said base portion and said base portion providing a support surface, a blade element abutting said ram surface and extending toward said support surface, means releasably connecting the blade element to said ram, anvil means slidably telescopically associated with said blade element and cooperable therewith for processing a workpiece during movement of the ram toward said base portion, said blade element being reciprocable relative to said anvil means, interengageable means on said blade element against complete separation from said anvil means, and means releasably connecting said anvil means on said base portion and against said support surfaces, said blade element and said anvil means being removable and replaceable as unit.

2. An apparatus, as defined in claim 1, wherein said means releasably connecting the blade element to said ram comprises a pin element on and extending transversely of said ram and generally parallel to said ram surface, and aperture means in said blade element receiving said pin element.

3. An apparatus, as defined in claim 2, wherein said means releasably connecting blade element to said ram comprises a latch member pivotally connected to said ram and removably overlapping a side portion of said blade element for retaining the blade element on said pin element.

4. An apparatus, as defined in claim 1, wherein said means releasably connecting said anvil means to said base portion comprises a pair of spaced apart generally parallel flanges overlying said support surface and projecting toward each other, and shoulders on said anvil means projecting beneath said flanges.

5. An apparatus, as defined in claim 4, wherein said means releasably connecting said blade element to said ram comprises a pin element on and extending transversely of said ram and generally parallel to said ram surface and also generally parallel to said flanges, and aperture means in said blade element receiving said pin element.

6. An apparatus, as defined in claim 1, wherein said blade element includes opposite parallel side surfaces, said anvil means including opposite parallel guide surfaces engaging and guiding said side surfaces, said blade element having a notch opening at a free end of and partially defined by a shearing edge facing said anvil means, said anvil means including a complementary shearing edge cooperable with the blade element edge for severing a slug from a workpiece, and passageway means through said anvil means for discharging a severed slug.

7. A die unit of the type described comprising a reciprocable blade element having means adjacent one end thereof connectable with a member for actuating the blade element, notch means in said blade element opening at an opposite end thereof and partially defined by an arcuate surface facing said opposite end, said blade element including opposite flat parallel side surfaces intersected by said arcuate surface, the intersections between said arcuate surface and said flat side surfaces providing shearing edges, anvil means relatively slidably and telescopically receiving said opposite end of said blade element, said anvil means including opposing inwardly facing surfaces slidably engaging and guiding said side surfaces of said blade element, said anvil means including notch means therein intersecting said anvil means surfaces and providing shearing edges complementary to and cooperable with first mentioned shearing edges, said anvil means having a passageway therethrough for permitting discharge of a processed workpiece, and inter-engageable shoulder means on said blade element and anvil means retaining said blade element against separation from the anvil means 8. A die set, as defined in claim 7, wherein said means adapting said blade element for connection to an actuating member comprises aperture means for receiving a pin projecting from the actuating member, and said anvil means including shoulder means extending generally parallel to said aperture means and cooperable with complementary shoulder means for securing the anvil means against a support surface.

No references cited.

WILLIAM W. DYER, JR., *Primary Examiner.*
JAMES M. MEISTER, *Examiner.*